(12) United States Patent
Sasanuma et al.

(10) Patent No.: US 12,597,840 B2
(45) Date of Patent: Apr. 7, 2026

(54) ACTUATOR

(71) Applicant: FOSTER ELECTRIC COMPANY, LIMITED, Tokyo (JP)

(72) Inventors: Tatsushi Sasanuma, Akishima (JP); Takeshi Yamamoto, Akishima (JP); Kazuki Ida, Akishima (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 188 days.

(21) Appl. No.: 18/685,972

(22) PCT Filed: Aug. 26, 2022

(86) PCT No.: PCT/JP2022/032182
§ 371 (c)(1),
(2) Date: Feb. 23, 2024

(87) PCT Pub. No.: WO2023/032837
PCT Pub. Date: Mar. 9, 2023

(65) Prior Publication Data

US 2024/0396418 A1    Nov. 28, 2024

(30) Foreign Application Priority Data

Aug. 31, 2021    (JP) ................................. 2021-141919

(51) Int. Cl.
*H02K 33/18*      (2006.01)
*G06F 3/01*      (2006.01)
(52) U.S. Cl.
CPC ............. *H02K 33/18* (2013.01); *G06F 3/016* (2013.01)

(58) Field of Classification Search
CPC ................................ H02K 33/18; G06F 3/016
See application file for complete search history.

(56) References Cited

U.S. PATENT DOCUMENTS

| | | | | | |
|---|---|---|---|---|---|
| 2006/0266967 | A1* | 11/2006 | Miura | ..................... | H02K 5/04 |
| | | | | | 251/129.15 |
| 2014/0185839 | A1* | 7/2014 | Hashimoto | ............ | H04R 9/066 |
| | | | | | 381/162 |

(Continued)

FOREIGN PATENT DOCUMENTS

| | | |
|---|---|---|
| JP | 2020195999 A | 12/2020 |
| WO | WO-2013/047017 A1 | 4/2013 |

(Continued)

OTHER PUBLICATIONS

Search Report and Written Opinion in International Application No. PCT/JP2022/032182 dated Nov. 8, 2022, 9 pages.

*Primary Examiner* — Forrest M Phillips
(74) *Attorney, Agent, or Firm* — MARSHALL, GERSTEIN & BORUN LLP

(57) ABSTRACT

An actuator includes an attachment member including a coil; a movable element having a magnet disposed opposite to the coil, and that is displaced relative to the attachment member when the coil is energized; a resilient support; and a cushioning material. The resilient support has an attachment member-side fixing portion that is fixed to the attachment member, a movable element-side fixing portion that is fixed to the movable element, and a deformation portion that links the attachment member-side fixing portion and the movable element-side fixing portion. The cushioning material is provided between the attachment member and the deformation portion, and deforms in conjunction with bending deformation of the deformation portion.

11 Claims, 9 Drawing Sheets

(56)          References Cited

U.S. PATENT DOCUMENTS

| | | | |
|---|---|---|---|
| 2014/0232211 A1* | 8/2014 | Katada | .................. H02K 33/16 |
| | | | 310/25 |
| 2015/0198215 A1* | 7/2015 | Koyama | ................ F16F 7/104 |
| | | | 267/136 |
| 2018/0229270 A1* | 8/2018 | Nakazato | ............... H02K 33/06 |
| 2020/0381987 A1 | 12/2020 | Takahashi et al. | |
| 2022/0149710 A1 | 5/2022 | Takahashi | |

FOREIGN PATENT DOCUMENTS

| | | |
|---|---|---|
| WO | WO-2020/184439 A1 | 9/2020 |
| WO | WO-2021/145209 A1 | 7/2021 |

* cited by examiner

ACTUATOR

TECHNICAL FIELD

The present disclosure relates to an actuator.

BACKGROUND ART

International Publication (WO) No. 2020/184439 discloses an actuator provided with an attachment member having a coil, and a movable element that is supported by the attachment member via a resilient support and that is displaced when the coil is energized. The resilient support described in this document is configured by a pair of spring members formed by metal plates, and a cushioning material disposed between the pair of spring materials. Further, displacement of the movable element is enabled by bending of this resilient support. In addition, since the resilient support is equipped with a cushioning material, it is possible to quickly attenuate the vibrations of the resilient support.

SUMMARY OF THE INVENTION

Problem to be Solved by the Invention

Incidentally, in the resilient support described in WO No. 2020/184439, it is necessary to adhere a cushioning material formed in a shape corresponding to the pair of spring materials to the one spring material and to the other spring material. Therefore, it is difficult to reduce the amount of cushioning material used.

The present disclosure takes the foregoing circumstances into consideration and aims to provide an actuator that can reduce the amount of cushioning material used.

Means for Solving the Problem

An actuator of a first aspect includes: an attachment member including a coil; a movable element having a magnet disposed facing the coil, the movable element being displaced relative to the coil by energization of the coil; a resilient support having an attachment member-side fixing portion that is fixed to the attachment member, a movable element-side fixing portion that is fixed to the movable element, and a deformation portion that links the attachment member-side fixing portion and the movable element-side fixing portion; and a cushioning material provided between the attachment member and the deformation portion, the cushioning material deforming in conjunction with bending deformation of the deformation portion.

In the actuator of the first aspect, when the coil is energized, the movable element having the magnet is displaced relative to the attachment member. Further, when the movable element is displaced with respect to the attachment member, the deformation portion of the resilient support is flexibly deformed. When the deformation portion of the resilient support is bent and deformed, the cushioning material provided between the attachment member and the deformation portion of the resilient support is deformed. As a result, vibration of the resilient support can be attenuated. Here, in the present aspect, the cushioning material is provided between the attachment member and the deformation portion of the resilient support. As a result, compared to a structure in which, for example, the resilient support includes a pair of spring materials, and cushioning materials formed in a shape corresponding to the pair of spring materials are adhered to one spring material and the other spring material, in the present aspect, the amount of the cushioning material that is used can be reduced.

An actuator of a second aspect is the actuator of the first aspect, in which the resilient support and the cushioning material are disposed overlapping with each other in a thickness direction, and the cushioning material has an adhesive surface at a side of the deformation portion, the adhesive surface being adhered to the deformation portion.

In the actuator of the second aspect, the adhesive surface of the cushioning material is adhered to the deformation portion of the resilient support. As a result, even if the area as viewed from the thickness direction is reduced, the damping effect of the cushioning material can be enhanced.

An actuator of a third aspect is the actuator of the second aspect, in which the cushioning material has an adhesive surface at a side of the attachment member, the adhesive surface being adhered to the attachment member.

In the actuator of the third aspect, the adhesive surface of the cushioning material is adhered to the attachment member. As a result, even if the area as viewed from the thickness direction is reduced, the damping effect of the cushioning material can be enhanced yet further.

An actuator of a fourth aspect is the actuator of the second aspect or the third aspect, in which the cushioning material has a surplus portion that does not overlap with the deformation portion as viewed from the thickness direction, the actuator further includes a cover member, the deformation portion is disposed between the cover member and the cushioning material, and the cover member is applied to the surplus portion.

In the actuator of the fourth aspect, the deformation portion is arranged between the cover member and the cushioning material, and the cover member is applied to the surplus portion. As a result, the surplus portion of the cushioning material can be covered by the cover member. Further, by disposing the deformation portion between the cushioning material and the cover member, the damping effect can be enhanced.

An actuator of a fifth aspect is the actuator of the fourth aspect, in which the cover member has an adhesive surface, the adhesive surface being adhered to the deformation portion and to the cushioning material.

In the actuator of the fifth aspect, the adhesive surface of the cover member can be adhered to the deformation portion and to the cushioning material.

An actuator of a sixth aspect is the actuator of any one of the first to fifth aspects, in which the cushioning material is provided in a compressed state between the attachment member and the deformation portion.

In the actuator of the sixth aspect, the cushioning material is provided in a compressed state between the attachment member and the deformation portion of the resilient support. As a result, even when the deformation portion of the resilient support deforms toward the opposite side from the attachment member, the state of contact between the cushioning material and the deformation portion of the resilient support and the state of contact between the cushioning material and the attachment member can be maintained.

An actuator of a seventh aspect is the actuator of any one of the first to sixth aspects, in which the cushioning material is provided at a side of the attachment member-side fixing portion of the deformation portion.

In the actuator of the seventh aspect, the cushioning material is provided at the deformation portion of the resilient support at a side of the attachment member-side fixing portion. As a result, since the amount of deformation of the deformation portion is small compared to a configuration in which the cushioning material is provided closer to the movable element-side fixing portion than to this portion, the amount of deformation of the cushioning material can be suppressed. As a result, degradation of the cushioning material due to repeated deformation can be suppressed.

An actuator of an eight aspect is the actuator of the seventh aspect, in which: when a displacement direction in which the movable element displaces is designated a $\pm Z$ direction and mutually perpendicular directions among directions in a plane orthogonally intersecting the $\pm Z$ direction are designated an X direction and a Y direction, the deformation portion includes an arm extending from the movable element-side fixing portion to the attachment member-side fixing portion, the arm including: a first X-direction outer extension portion extending from a side of the movable element-side fixing portion toward an outer side in the X direction, a first return portion formed closer to the attachment member-side fixing portion than the first X-direction outer extension portion, at which an extension direction is turned back from the outer side in the X direction to an inner side in the X direction, an X-direction inner extension portion extending from the first return portion toward the inner side in the X direction, a second return portion formed closer to the movable element-side fixing portion than the X-direction inner extension portion, at which the extension is turned back from the inner side in the X direction to the outer side in the X direction, a second X-direction outer extension portion extending from the second return portion toward the outer side in the X direction, a third return portion formed closer to the attachment member-side fixing portion than the second X-direction outer extension portion, at which the extension is turned from the outer side in the X direction to an outer side in the Y direction, and a Y-direction outer extension portion extending from the third return portion toward the outer side in the Y direction and connected to the attachment member-side fixing portion, and the cushioning material is provided along the second X-direction outer extension portion, the third return portion, and the Y-direction outer extension portion.

In the actuator of the eighth aspect, the arm of the deformation portion of the resilient support includes a first X-direction outer extension portion, a first return portion, an X-direction inner extension portion, a second return portion, a second X-direction outer extension portion, a third return portion and a Y-direction outer extension portion. As a result, compared to a configuration without the third return portion or the Y-direction outer extension portion, the length of the arm of the deformation portion can be increased. By increasing the length of the arm, the resonance frequency can be lowered. In addition, the load on the resilient support can be reduced, the load applied to the movable element-side fixing portion and the attachment member-side fixing portions can also be reduced, and the occurrence of metal fatigue can be made less likely. Further, the cushioning material is provided along the second X-direction outer extension portion, the third return portion, and the Y-direction outer extension portion. In this way, by providing the third return portion and the Y-direction outer extension portion, the cushioning material can be easily disposed between the arm and the attachment member at a position at which the amount of deformation of the arm is small. Compared to a case in which the cushioning material is provided along the first X-direction outer extension portion, the first return portion, the X-direction inner extension portion and the second return portion, the amount of deformation of the cushioning material can be suppressed. As a result, degradation of the cushioning material due to repeated deformation can be suppressed.

An actuator of a ninth aspect is the actuator of the eighth aspect, including two of the cushioning materials, in which: the resilient support includes four of the attachment member-side fixing portions and four of the arms, two of the four arms are disposed at one side in the X direction relative to the movable element-side fixing portion and are formed symmetrically in the Y direction, another two of the four arms are disposed at another side in the X direction relative to the movable element-side fixing portion and are formed symmetrically in the Y direction, one of the cushioning materials is provided at a position at which the two arms disposed at the one side in the X direction relative to the movable element-side fixing portion adhere at a same surface thereof, and another of the cushioning materials is provided at a position at which the other two arms disposed at the other side in the X direction relative to the movable element-side fixing portion adhere at a same surface thereof.

In the actuator of the ninth aspect, the configuration is such that two cushioning materials are provided for four arms. As a result, compared to a configuration in which four cushioning materials are respectively provided for four arms, the number of pieces of the cushioning material can be reduced.

An actuator of a tenth aspect is the actuator of the ninth aspect, in which: the deformation portion is formed in a plate shape, a Y-direction connecting portion that connects, in the Y direction, the third return portions of the two arms disposed at the one side in the X direction relative to the movable element-side fixing portion, and a Y-direction connecting portion that connects, in the Y direction, the third return portions of the other two arms disposed at the other side in the X direction relative to the movable element-side fixing portion, are provided, the one of the cushioning materials is provided along one of the Y-direction connecting portions, and the other of the cushioning materials is provided along another of the Y-direction connecting portions.

In the actuator of the tenth aspect, by providing Y-direction connecting portions that connect the third return portions of the arms in the Y direction, compared to a configuration without the Y-direction connecting portions, the flatness of the deformation portion, which is formed in a plate shape, can be increased. Further, since the flatness of the deformation portion is maintained both as a single part and during the assembly process, individual differences in parts are less likely to occur, and variations in spring coefficients (variations in hardness and stiffness) can be suppressed.

Effect of the Invention

The actuator according to the present disclosure has the excellent effect of being able to reduce the amount of cushioning material used.

BEST MODE FOR CARRYING OUT THE INVENTION

Figure 1:
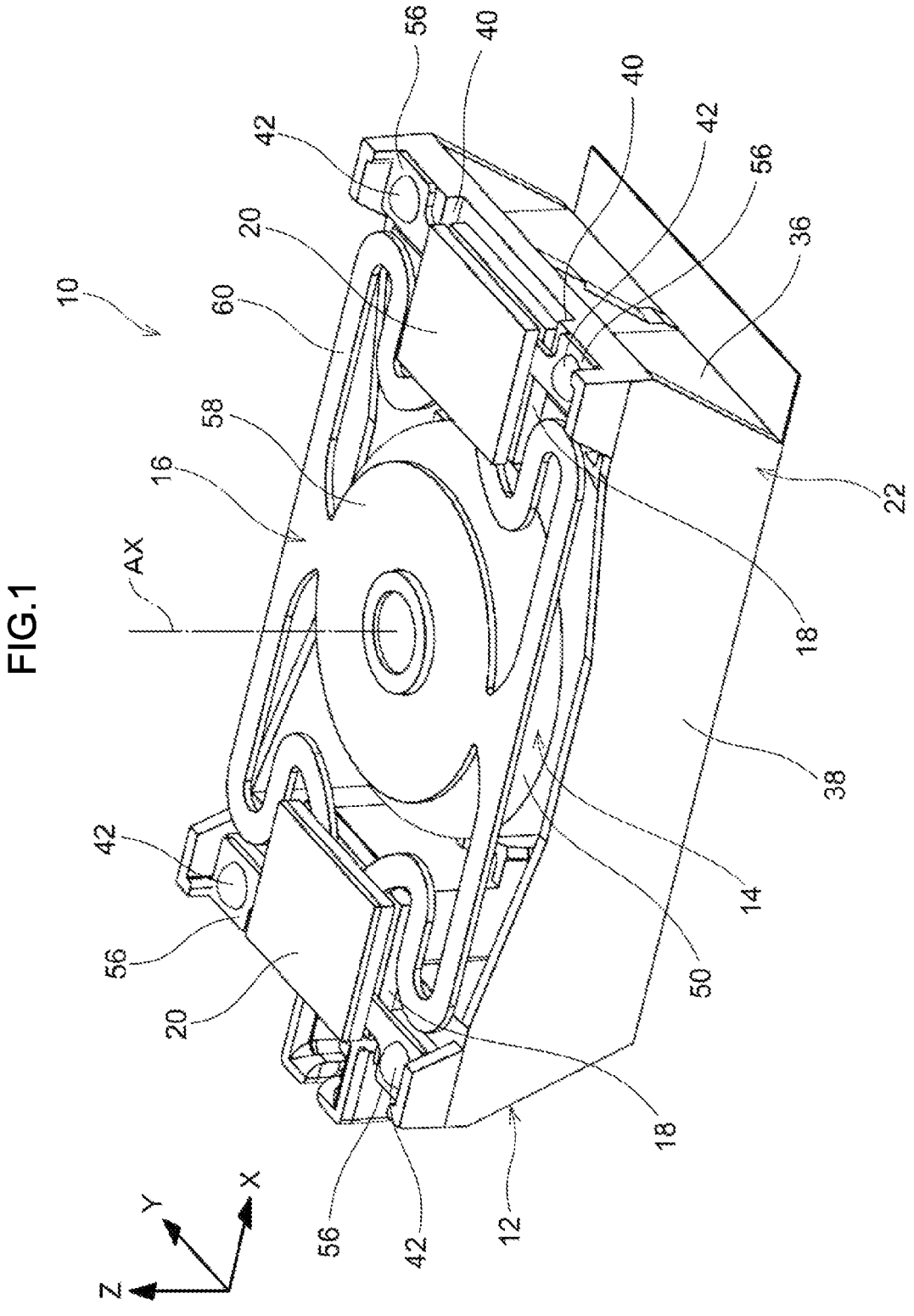
FIG. 1 is a perspective view showing an actuator.

An actuator 10 according to an embodiment of the present disclosure will be explained using FIGS. 1 to 5. Note that the arrow X direction, arrow Y direction, and arrow Z direction shown in the drawings indicate respective directions of the actuator 10. In the following description, the +Z direction shown in the respective drawings will be referred to as an upward direction, and the −Z direction will be referred to as a downward direction. However, this is a directional concept based on the actuator, and does not limit the attachment posture of the actuator. Further, an axis parallel to the Z direction and passing through the center of gravity of a movable element 14, which is described below, is referred to as a center of gravity axis AX of the movable element 14. Further, the direction approaching the center of gravity axis AX of the movable element 14 in the X direction is referred to as the X direction inner side, and the direction departing therefrom is referred to as the X direction outer side. In the Y direction, the direction approaching the center of gravity axis AX of the movable element 14 is referred to as the Y direction inner side, and the direction departing therefrom is referred to as the Y direction outer side. Further, the +X direction refers to one side in the X direction, the −X direction to the other side in the X direction, the +Y direction to one side in the Y direction, the −Y direction to the other side in the Y direction, the +Z direction to one side in the Z direction, and the −Z direction to the other side in the Z direction.

As shown in FIGS. 1 to 4, by, for example, being attached to a display unit such as a liquid crystal panel configured as a touch panel or to various controllers, the actuator 10 of the present embodiment is an actuator that vibrates the display unit or controller. By controlling the energization of this actuator 10, it is possible to provide various tactile sensations with respect to a user's fingers touching the touch panel, controller, or the like.

Figure 2:
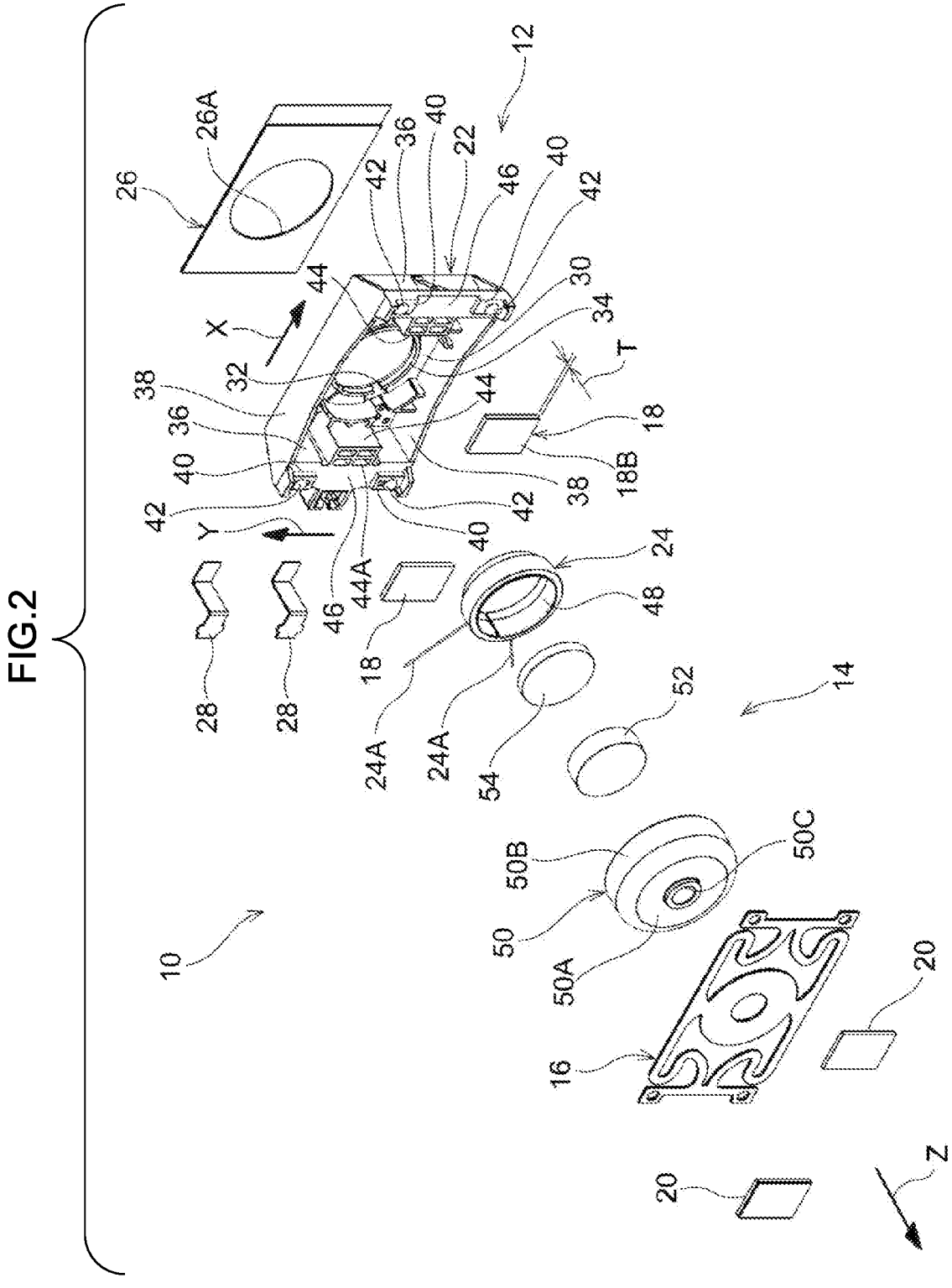
FIG. 2 is an exploded perspective view of the actuator.

As shown in FIGS. 1 and 2, the actuator 10 includes an attachment member 12 that is attached to an attachment target such as a display unit of a tablet terminal, a movable element 14 that is displaced relative to the attachment member 12, and a resilient support 16 that resiliently supports the movable element 14 with respect to the attachment member 12. Further, the actuator 10 includes two cushioning materials 18 that attenuate vibrations of the resilient support 16, and two cover members 20 that are attached to the resilient support 16 and cover one side of the cushioning materials 18.

(Configuration of Attachment Member 12)

As shown in FIG. 2, the attachment member 12 includes a frame 22 formed in a box shape, a coil 24 formed by winding a conductive wire in a ring, an attachment adhesive sheet 26, and a pair of terminals 28.

Figure 4:
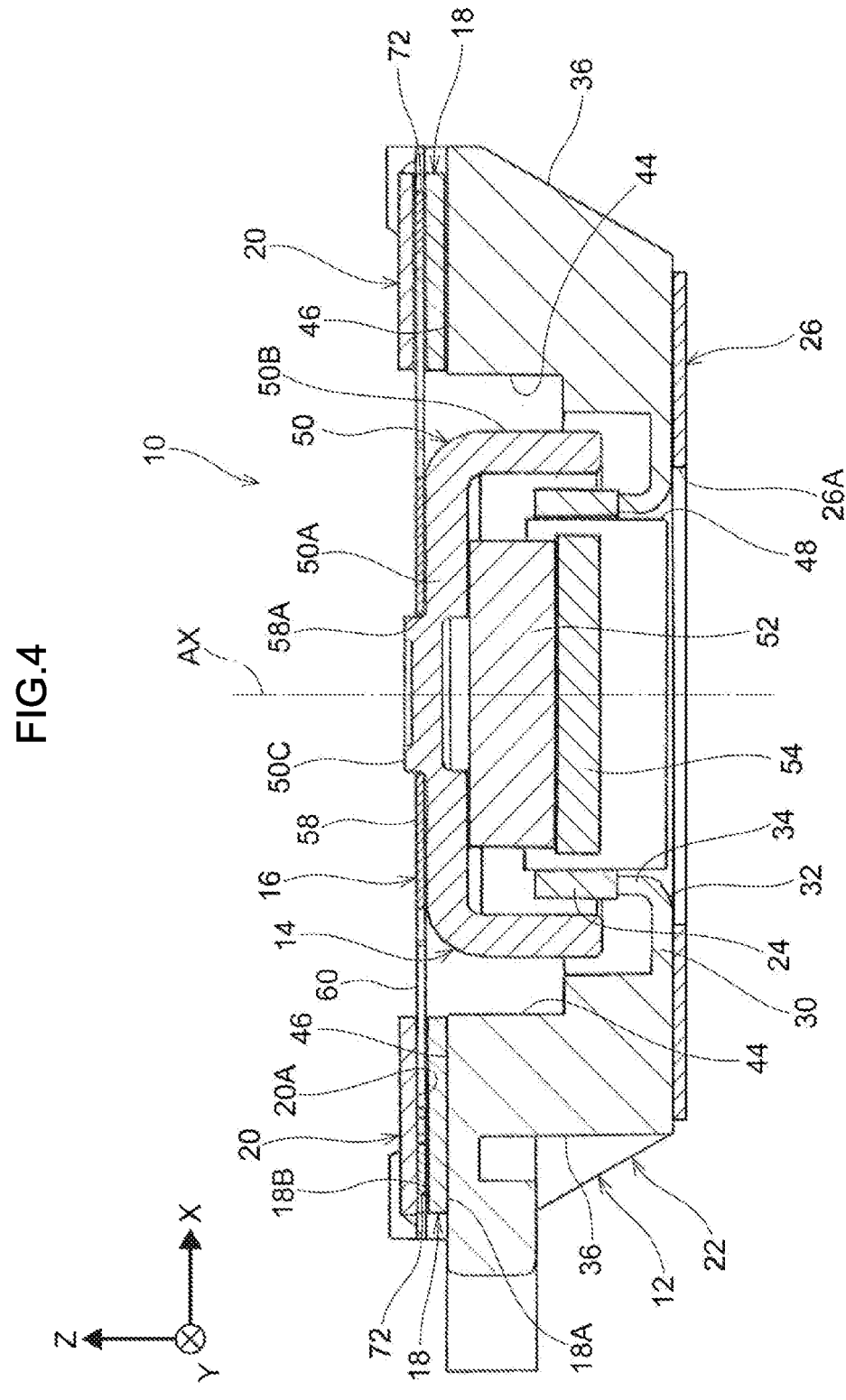
FIG. 4 is a cross-sectional view of the actuator taken along line 4-4 shown in FIG. 3A.

The frame 22 is made of a resin material, for example, and is formed in a box shape with one side open in the Z direction. This frame 22 includes a bottom wall portion 30 formed in a rectangular shape with the Z direction as the thickness direction, and as viewed from the Z direction, the X direction as the longitudinal direction and the Y direction as the transverse direction. As shown in FIGS. 2 and 4, a circular opening 32 penetrating in the Z direction is formed at the center, in the X and Y directions, of the bottom wall portion 30. Further, the frame 22 includes an annular rib 34 that protrudes from the edge of the opening 32 of the bottom wall portion 30 in the Z direction.

Further, the frame 22 includes a pair of first side walls 36 respectively rising toward one side in the Z direction from the ends of the bottom wall portion 30 at one side and the other side in the X direction, and a pair of second side walls 38 respectively rising toward the one side in the Z direction from the ends of the bottom wall 30 at one side and the other side in the Y direction.

As shown in FIG. 2, from the end portions on one side and the other side in the Y direction of the end surfaces on the one side in the Z direction of the pair of first side walls 36, two pedestal portions 40 formed in a rectangular block shape respectively protrude toward the one side in the Z direction. Further, from the two pedestals 40, a welding boss portion 42 (welding portion) formed in a columnar shape in a state before welding, which is described below, projects toward the one side in the Z direction.

The frame 22 also includes a central protrusion 44 that protrudes from the center, in the Y direction, of one first side wall 36 toward the other first side wall 36. Further, the frame 22 includes a central protrusion 44 that protrudes from the center, in the Y direction, of the other first side wall 36 toward the one first side wall 36. In the present embodiment, these central protrusions 44 are formed with plural depressions 44A that are open on the one side in the Z direction. Here, the center portion, in the Y direction, of the end surface on the one side in the Z direction of one central protruding portion 44 and of the end surface on the one side in the Z direction of one first side wall 36 serves as a cushioning material application surface 46 to which one of the cushioning materials 18, which is described below, is applied. Further, the center portion, in the Y direction, of the end surface on the one side in the Z direction of the other central protrusion 44 and of the end surface on the one side in the Z direction of the other first side wall 36 serves as a cushioning material application surface 46 to which the other cushioning material 18, which is described below, is applied.

(Configuration of Coil 24)

As shown in FIGS. 2 and 4, the coil 24 is formed by winding a conductive wire in an annular shape around a coil base 48 formed in an annular shape with the Z direction as the axial direction. This coil 24 is supported by the frame 22 together with a coil base 48. In addition, in a state in which the coil 24 is supported by the frame 22 together with the coil base 48, the coil 24 abuts against the rib 34 of the frame 22. Note that a pair of terminal portions 24A of the coil 24 are respectively connected to the pair of terminals 28 supported by the frame 22.

(Configuration of Attachment Adhesive Sheet 26)

The attachment adhesive sheet 26 is a member for attaching the actuator 10 to an attachment target. The attachment adhesive sheet 26 is an adhesive sheet with an adhesive surface on both sides. The attachment adhesive sheet 26 is adhered to the lower surface side of the bottom wall portion 30 of the frame 22. A circular opening 26A corresponding to the opening 32, formed in the bottom wall portion 30 of the frame 22, is formed in the attachment adhesive sheet 26.

(Configuration of Movable Element 14)

The movable element 14 includes a yoke 50, a magnet 52, and a pole piece 54.

The yoke 50 is formed using a soft magnetic material. This yoke 50 is provided with a top wall portion 50A formed in a disk shape with a thickness direction in the Z direction, and a peripheral wall portion 50B extending downward from the outer peripheral edge of the top wall portion 50A. Further, the yoke 50 includes a fixed convex portion 50C that protrudes from the center of the surface of the top wall portion 50A on the one side in the Z direction toward the one side in the Z direction.

The magnet 52 is formed into a disk shape with the Z direction as the axial direction. This magnet 52 is fixed to the lower surface side of the top wall portion 50A of the yoke 50 in a state of being disposed at an inner side the peripheral wall portion 50B of the yoke 50.

The pole piece 54 is formed using a soft magnetic material. This pole piece 54 is formed into a disk shape with the Z direction as the axial direction, and is fixed to the lower surface side of the magnet 52.

A magnetic circuit is formed in the movable element 14 explained above by the yoke 50, the magnet 52, and the pole piece 54. A space is formed between the magnet 52 and the pole piece 54, and the peripheral wall portion 50B of the yoke 50, and the coil 24 is disposed in this space. The height of the lower end of the peripheral wall portion 50B of the yoke 50 matches that of the lower end of the pole piece 54. The pole piece 54 may have a height that projects downward from the lower end of the peripheral wall portion 50B.

(Configuration of Resilient Support 16)

Figure 5:
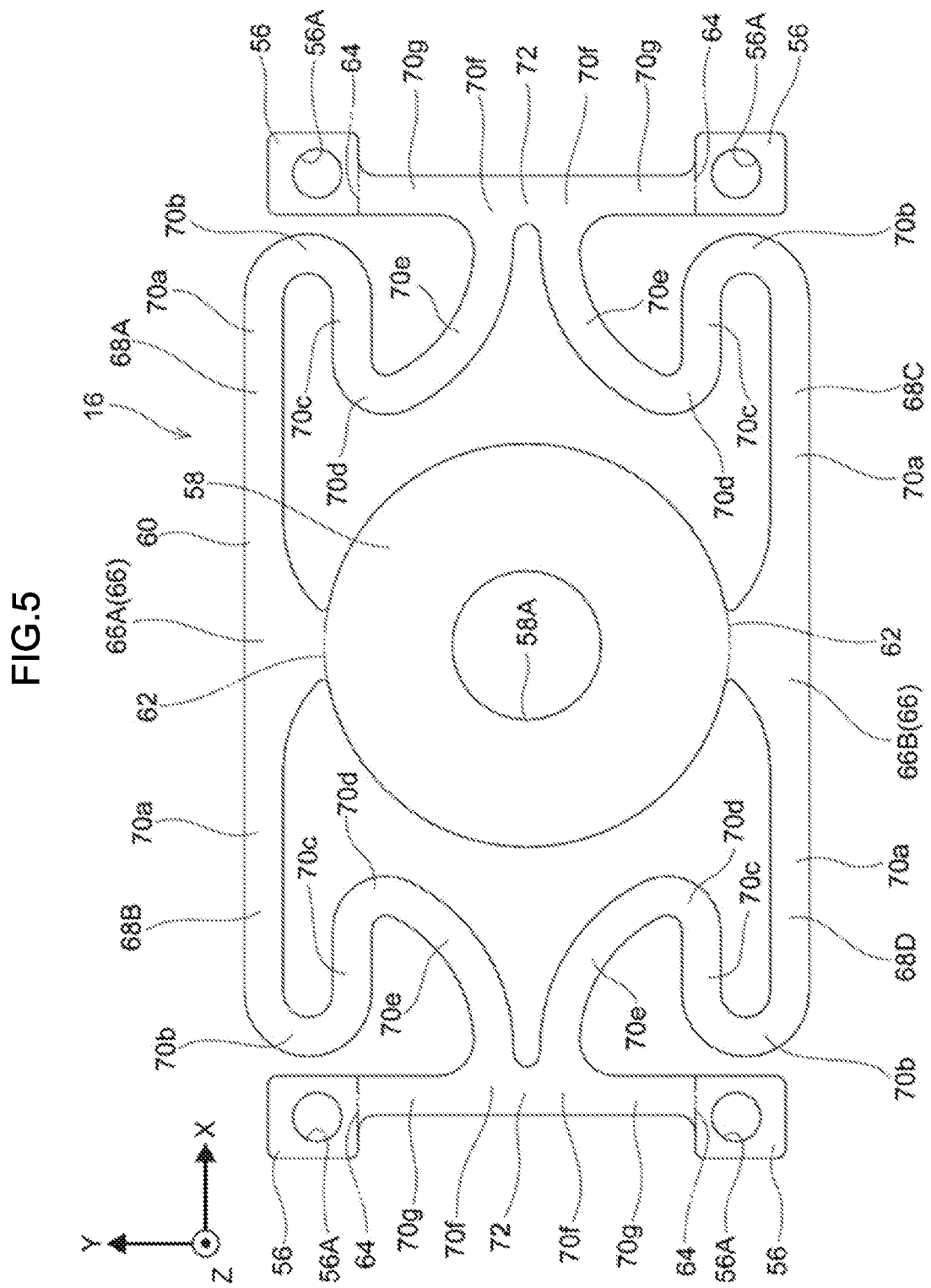
FIG. 5 is a plan view of the resilient support.

As shown in FIGS. 3 and 5, the resilient support 16 is formed using a metal plate formed, for example, in a plate-shape (planar). The shape of this resilient support 16 in its free state (a state with no external force acting on it) is such that the entire resilient support 16 is formed in a plate shape extending in a direction perpendicular to the Z direction.

The resilient support 16 is fixed to the attachment member 12 at one portion and to the movable element 14 at another portion. A portion of the resilient support 16 between the portion fixed to the attachment member 12 and the portion fixed to the movable element 14 is a deformation portion 60, and this deformation portion 60 is a portion that deforms when the movable element 14 is displaced (vibrated). That is, the resilient support 16 is configured by four attachment member-side fixing portions 56 that are fixed to the attachment member 12, a movable element-side fixing portion 58 that is fixed to the movable element 14, and a deformation portion 60 that links the attachment member-side fixing portions 56 with the movable element-side fixing portion 58.

The four attachment member-side fixing portions 56 are formed in a rectangular shape corresponding to the four pedestal portions 40 of the frame 22 as viewed in the Z direction. A circular fixing hole 56A penetrating in the Z direction is formed in each of the four attachment member-side fixing portions 56. The four welding boss portions 42 of the frame 22 are inserted into the fixing holes 56A of the four attachment member-side fixing portions 56, respectively. Furthermore, by welding (thermally caulking) the end of the welding boss portion 42 of the frame 22 on the one side in the Z direction, the four attachment member-side fixing portions 56 are fixed to the four pedestal portions 40 of the frame 22, respectively. In addition, in a state in which the four attachment member-side fixing portions 56 are respectively fixed to the four pedestal portions 40 of the frame 22, the four attachment member-side fixing portions 56 cannot be separated from the four pedestal portions 40 of the frame

22, respectively. Here, each drawing represents the state after the welding boss portion 42 has been thermally caulked.

The movable element-side fixing portion 58 is formed in a circular shape with a smaller diameter than the top wall portion 50A of the yoke 50 that configures a part of the movable element 14, as viewed from the Z direction. A circular fixing hole 58A is formed in a central part of the movable element-side fixing portion 58. Further, the fixed convex portion 50C of the yoke 50 is inserted into the fixing hole 58A of the movable element-side fixing portion 58. Furthermore, by deforming (crimping) the end of the fixed convex portion 50C of the yoke 50 on the one side in the Z direction with a punch or the like, the movable element-side fixing portion 58 is fixed to the yoke 50. In addition, in each drawing, a state in which the fixed convex portion 50C is deformed is not represented.

The deformation portion 60 includes, from a starting end 62 to a terminal end 64, a one side starting point portion 66A and another side starting point portion 66B, and four arms 68A, 68B, 68C, and 68D. In the following explanation, the four arms 68A, 68B, 68C, and 68D may be referred to as a first arm 68A, a second arm 68B, a third arm 68C, and a fourth arm 68D, respectively.

Here, the starting end 62 refers to the starting part of the deformation portion 60 when the deformation portion 60 is defined as a portion that extends from the side of the movable element-side fixing portion 58 toward the side of the attachment member-side fixing portions 56. Specifically, the starting end 62 coincides with the boundary between the movable element-side fixing portion 58 and the deformation portion 60. Further, in the present embodiment, there are two starting ends 62, one starting end 62 being on one side in the Y direction and the other starting end 62 being on the other side in the Y direction.

Further, the terminal end 64 refers to the end of the deformation portion 60 when the deformation portion 60 is defined as a portion that extends from the side of the movable element-side fixing portion 58 toward the side of the attachment member-side fixing portions 56. Specifically, it coincides with the boundary between the deformation portion 60 and the attachment member-side fixing portions 56. In the present embodiment, there are four terminal ends 64 corresponding to the four attachment member-side fixing portions 56 and the four arms 68A, 68B, 68C, and 68D.

Both the one side starting point portion 66A and the other side starting point portion 66B are adjacent to the movable element-side fixing portion 58 in the Y direction. The one side starting point portion 66A is located on the one side in the Y direction of the movable element-side fixing portion 58, and the other side starting point portion 66B is located on the other side in the Y direction of the movable element-side fixing portion 58.

The deformation portion 60 branches from the one side starting point portion 66A toward one side and the other side in the X direction, and is connected to the first arm 68A and the second arm 68B, respectively. The deformation portion 60 also branches from the other side starting point portion 66B toward the one side and the other side in the X direction, and is connected to the third arm 68C and the fourth arm 68D, respectively. In addition, when the one side starting point portion 66A and the other side starting point portion 66B are not particularly distinguished between, they are simply referred to as the starting point portion 66.

Here, the deformation portion 60 of the present embodiment has a symmetrical shape in both the X direction and the Y direction, and the four arms 68A, 68B, 68C, and 68D have similar shapes. Specifically, the first arm 68A and the third arm 68C are arranged on one side in the X direction with respect to the movable element-side fixing portion 58 and are formed symmetrically in the Y direction. Further, the second arm 68B and the fourth arm 68D are arranged on the other side in the X direction with respect to the movable element-side fixing portion 58, and are formed symmetrically in the Y direction. Furthermore, the first arm 68A and the second arm 68B are formed symmetrically in the X direction. Further, the third arm 68C and the fourth arm 68D are formed symmetrically in the X direction.

Each arm 68A, 68B, 68C, 68D has, from the starting point portion 66 toward the respective attachment member-side fixing portion 56, a first X-direction outer extension portion 70a, a first return portion 70b, an X-direction inner extension portion 70c, a second return portion 70d, a second X-direction outer extension portion 70e, a third return portion 70f, and a Y-direction outer extension portion 70g, in this order.

The first X-direction outer extension portion 70a is a portion that extends outward in the X direction from the side of the movable element-side fixing portion 58. The extension direction of the first X-direction outer extension portion 70a is parallel to the X direction.

The first return portion 70b is formed closer to the attachment member-side fixing portion 56 than the first X-direction outer extension portion 70a, and in the first return portion 70b, the extension direction of the arms 68A, 68B, 68C, and 68D is turned back toward the inner side in the Y direction.

The X-direction inner extension portion 70c is a portion that extends inward in the X-direction from the first return portion 70b. The extension direction of the first X-direction inner extension portion 70c is parallel to the X direction.

The second return portion 70d is formed closer to the movable element-side fixing portion 58 than the X-direction inner extension portion 70c, and in the second return portion 70d, the extension direction of the arms 68A, 68B, 68C, and 68D is turned back toward the inner side in the Y direction.

The second X-direction outer extension portion 70e is a portion that extends outward in the X-direction from the second return portion 70d. The second X-direction outer extension portion 70e has a curved shape such that the inclination angle of its extension direction with respect to the X direction gradually becomes smaller toward the outer side in the X direction.

The third return portion 70f is formed closer to the attachment member-side fixing portion 56 than the second X-direction outer extension portion 70e, and at this third return portion 70f, the extension direction of the arms 68A, 68B, 68C, and 68D is turned from the outer side in the X direction to the outer side in the Y direction.

The Y-direction outer extension portion 70g extends outward in the Y-direction from the third return portion 70f, and is connected to the attachment member-side fixing portion 56 at the opposite side of the Y-direction outer extension portion 70g from the third return portion 70f. The extension direction of the Y-direction outer extension portion 70g is parallel to the Y direction.

Moreover, the resilient support 16 of the present embodiment is provided with a Y-direction connecting portion 72 that connects the third return portion 70f of the first arm 68A and the third return portion 70f of the third arm 68C in the Y direction, and is provided with a Y-direction connecting portion 72 that connects the third return portion 70f of the second arm 68B and the third return portion 70f of the fourth arm 68D in the Y direction. Each Y-direction connecting portion 72 extends in the Y direction at the same position in the X direction as each Y-direction outer extension portion 70g.

(Configuration of Cushioning Material 18)

Figure 3A:
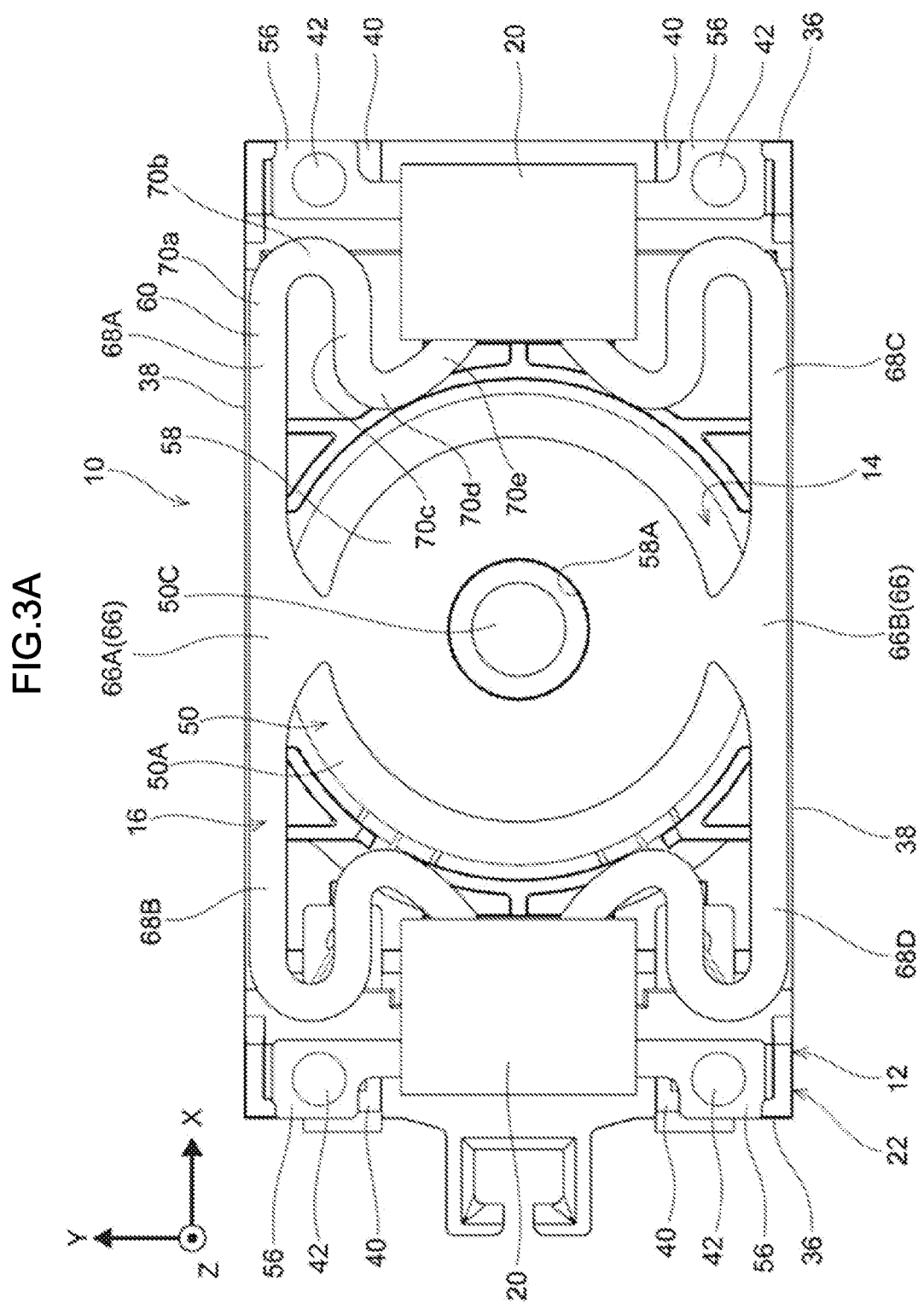
FIG. 3A is a plan view of the actuator.
Figure 3B:
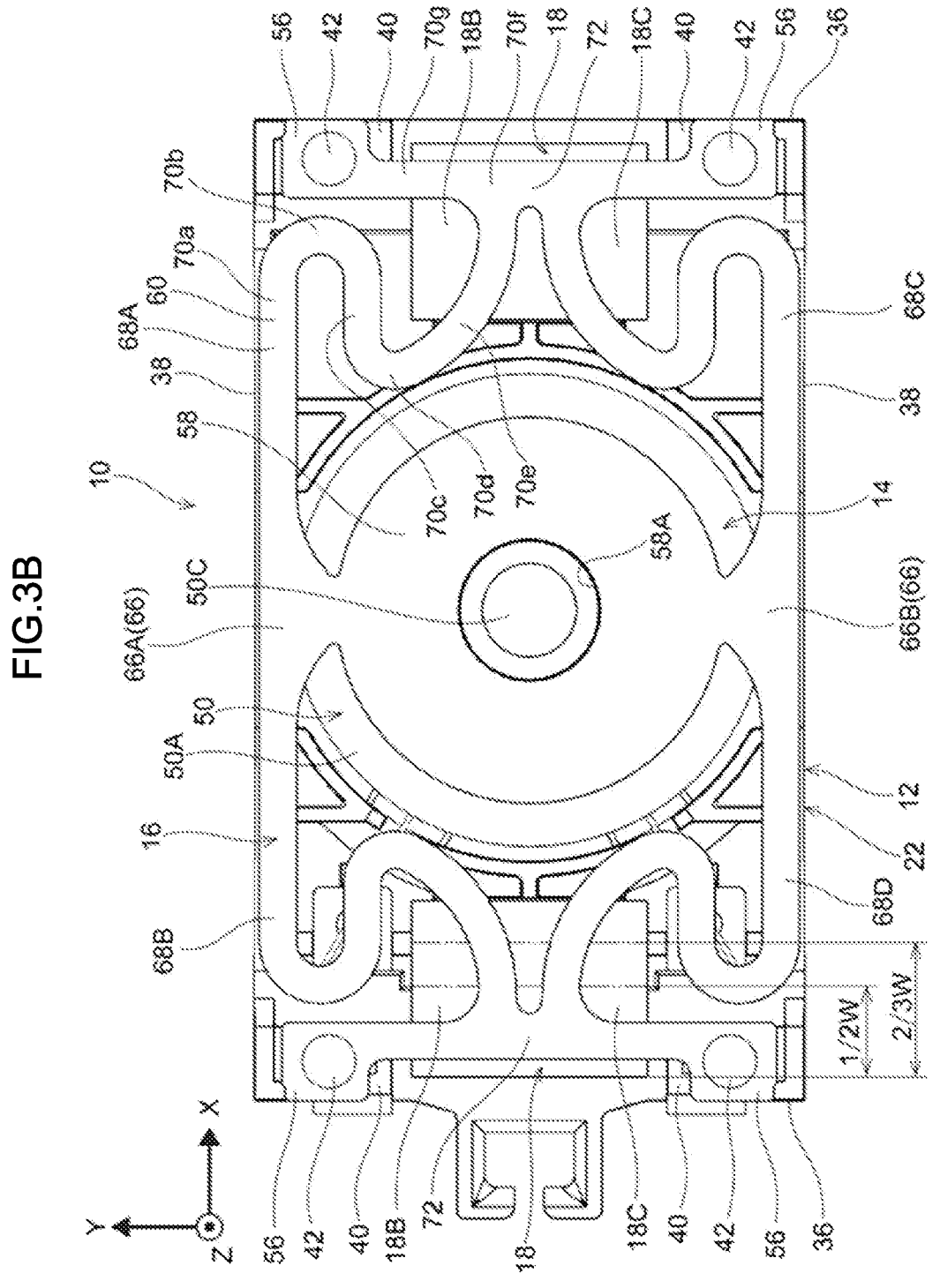
FIG. 3B is a plan view corresponding to FIG. 3A, from which illustration of a cover member is omitted.

As shown in FIGS. 2, 3B, and 4, the cushioning material 18 is formed in a plate shape using a viscoelastic material, has the Z direction as its thickness direction, and is formed in a rectangular shape as viewed in the Z direction. Specifically, the cushioning material 18 is formed in a rectangular shape with the Y direction as the longitudinal direction and the X direction as the transverse direction as viewed in the Z direction. The dimensions of the cushioning material 18 in the Y direction and the X direction are configured to correspond to the dimensions of the cushioning material application surface 46 of the frame 22 in the Y direction and the X direction.

The surface (lower surface) at the other side in the Z direction of the cushioning material 18 configures a first adhesive surface 18A serving as an adhesive surface that can be bonded to other members. Further, the surface (upper surface) at the one side in the Z direction of the cushioning material 18 configures a second adhesive surface 18B serving as an adhesive surface that can be bonded to other members. Here, only one of the upper or lower surfaces of the cushioning material 18 may be an adhesive surface, or neither the upper and lower surfaces of the cushioning material 18 need to be adhesive surfaces. Furthermore, the thickness dimension T of the cushioning material 18 in a single component state (a state before it is sandwiched and deformed between the cushioning material application surface 46 of the frame 22 and the resilient support 16) is configured to be larger than the clearance between the cushioning material application surface 46 of the frame 22 and the resilient support 16.

The first adhesive surface 18A of one of the cushioning materials 18 is applied to one of the cushioning material application surfaces 46 of the frame 22. As a result, one of the cushioning materials 18 is attached to one of the cushioning material application surfaces 46 of the frame 22. Similarly, the first adhesive surface 18A of the other cushioning material 18 is applied to the other cushioning material application surface 46 of the frame 22. As a result, the other cushioning material 18 is attached to the other cushioning material application surface 46 of the frame 22. Here, in a configuration in which the first adhesive surface 18A is not provided on the cushioning material 18, it is preferable to provide a holding portion such as a recess for holding the position of the cushioning material 18 in a portion of the frame 22 corresponding to the cushioning material application surface 46.

Next, the four welding boss portions 42 of the frame 22 are respectively inserted into the fixing holes 56A of the four attachment member-side fixing portions 56 of the resilient support 16, and the ends of the welding boss portions 42 on the one side in the Z direction are welded. As a result, the resilient support 16 is attached to the frame 22.

Here, in a state in which the resilient support 16 is attached to the frame 22, one of the cushioning materials 18 is disposed along the second X-direction outer extension portion 70e, the third return portion 70f, and the Y-direction outer extension portion 70g of each of the first arm 68A and the third arm 68C, as well as one of the Y-direction connecting portions 72. Moreover, in a state in which the resilient support 16 is attached to the frame 22, the second adhesive surface 18B of the one cushioning material 18 is applied to the other side surface (lower surface) in the Z direction of the second X-direction outer extension portion 70e, the third return portion 70f, and the Y-direction outer extension portion 70g of each of the first arm 68A and the third arm 68C, as well as of the one Y-direction connecting portion 72. In addition, in a state in which the resilient support 16 is attached to the frame 22, the one cushioning material 18 is in a crushed state (compressed state) between the second X-direction outer extension portion 70e, the third return portion 70f, and the Y-direction outer extension portion 70g of each of the first arm 68A and third arm 68C, and the one Y-direction connecting portion 72, and one of the cushioning material application surfaces 46 of the frame 22.

Similarly, in a state in which the resilient support 16 is attached to the frame 22, the other of the cushioning materials 18 is disposed along the second X-direction outer extension portion 70e, the third return portion 70f, and the Y-direction outer extension portion 70g of each of the second arm 68B and the third arm 68D, as well as the other of the Y-direction connecting portions 72. Further, in a state in which the resilient support 16 is attached to the frame 22, the second adhesive surface 18B of the other cushioning material 18 is applied to the other side surface (lower surface) in the Z direction of the second X-direction outer extension portion 70e, the third return portion 70f, and the Y-direction outer extension portion 70g of each of the second arm 68B and the third arm 68D, as well as of the other Y-direction connecting portion 72. In addition, in a state in which the resilient support 16 is attached to the frame 22, the other cushioning material 18 is in a crushed state (compressed state) between the second X-direction outer extension portion 70e, the third return portion 70f, and the Y-direction outer extension portion 70g of each of the second arm 68B and the third arm 68D, and the other Y-direction connecting portion 72, and the other of the cushioning material application surfaces 46 of the frame 22.

In addition, in the respective drawings, the crushed state of the cushioning material 18 between the second X-direction outer extension portion 70e, the third return portion 70f, and the Y-direction outer extension portion 70g of the respective arms 68A, 68B, 68C, 68D and the other cushioning material application surface 46 of the frame 22 is not reflected.

FIG. 3B shows a plan view of the actuator 10 in a state before two cover members 20, which are described below, are attached. The portion of the cushioning material 18 shown in this drawing at which the second adhesive surface 18B is visible will be referred to as the surplus portion 18C of the cushioning material 18. That is, in the cushioning material 18 shown in this drawing, the portion that does not overlap in the Z direction with the second X-direction outer extension portion 70e, the third return portion 70f, the Y-direction outer extension portion 70g, of the respective arms 68A, 68B, 68C, 68D, and with the Y-direction connecting portions 72, will be referred to as the surplus portion 18C of the cushioning material 18.

(Configuration of Cover Member 20)

The cover member 20 is formed in a plate shape using a viscoelastic material, has the Z direction as its thickness direction, and is formed in a rectangular shape as viewed in the Z direction. Specifically, the cover member 20 is formed in a rectangular shape with the Y direction as the longitudinal direction and the X direction as the transverse direction as viewed in the Z direction. The dimensions of the cover member 20 in the Y direction and the X direction are configured to correspond to the dimensions of the cushioning material 18 in the Y direction and the X direction.

The surface (lower surface) at the other side in the Z direction of the cover member 20 is an adhesive surface 20A that can be bonded to other members. Note that the surface (upper surface) at the one side in the Z direction of the cover member 20 is not an adhesive surface. As shown in FIGS. 3A and 3B, the adhesive surface 20A of one cover member 20 is applied to the second adhesive surface 18B of the surplus portion 18C of the one cushioning material 18, and is applied to the one side surface (upper surface) in the Z direction of the second X-direction outer extension portion 70e, the third return portion 70f, and the Y-direction outer extension portion 70g of each of the first arm 68A and the third arm 68C, as well as of the one Y-direction connecting portion 72. Further, the second X-direction outer extension portion 70e and the third return portion 70f of each of the first arm 68A and the third arm 68C, as well as the one Y-direction connecting portion 72, are disposed between the one cushioning material 18 and the one cover member 20. Similarly, the adhesive surface 20A of the other cover member 20 is applied to the second adhesive surface 18B of the surplus portion 18C of the other cushioning material 18, and is applied to the one side surface (upper surface) in the Z direction of the second X-direction outer extension portion 70e, the third return portion 70f, and the Y-direction outer extension portion 70g of each of the second arm 68B and the fourth arm 68D, as well as of the one Y-direction connecting portion 72. Further, the second X-direction outer extension portion 70e, the third return portion 70f, and the Y-direction outer extension portion 70g of each of the second arm 68B and the fourth arm 68D, as well as the other Y-direction connecting portion 72, are disposed between the other cushioning material 18 and the other cover member 20. In addition, in the respective drawings, a state in which the adhesive surface 20A of the cover member 20 is adhered to the second adhesive surface 18B of the surplus portion 18C of the cushioning material 18 is not shown.

(Mechanism and Effects of the Present Embodiment)

Next, the mechanism and effects of the exemplary embodiment are described.

As shown in FIGS. 1, 2 and 4, in the actuator 10 described above, the movable element 14 is supported by the resilient support 16, and in a state in which the coil 24 is not energized, the movable element 14 is at the original position shown in FIG. 4. In the actuator 10 of the present embodiment, the configuration is such that the coil 24 is fixed to the frame 22, and the magnet 52 and the like are provided at the movable element 14. Therefore, by energizing the coil 24, a thrust force is generated in the movable element 14 as a reaction force to the force generated from the coil 24. Further, by supplying alternating current to the coil 24, the movable element 14 vibrates in the vertical direction along the center of gravity axis AX.

Here, when the movable element 14 is displaced with respect to the attachment member 12, the deformation portion 60 of the resilient support 16 is flexibly deformed. When the deformation portion 60 of the resilient support 16 bends and deforms, the two cushioning materials 18 provided between the attachment member 12 and the deformation portion 60 of the resilient support 16 are deformed. As a result, vibration of the resilient support 16 can be attenuated. Here, in the present embodiment, the cushioning material 18 is provided between the attachment member 12 and the deformation portion 60 of the resilient support 16. As a result, in the present embodiment, compared to a structure in which, for example, the resilient support 16 includes a pair of spring materials, and cushioning materials formed in a shape corresponding to the pair of spring materials are adhered to one spring material and the other spring material, the amount of the cushioning material 18 used can be reduced.

Further, in the present embodiment, the first adhesive surface 18A and the second adhesive surface 18B of the cushioning material 18 are configured to be adhered to the cushioning material application surface 46 of the frame 22 and the resilient support 16, respectively. As a result, even if the area of the cushioning material 18 when viewed from the thickness direction is reduced, the damping effect of the cushioning material 18 can be enhanced.

In addition, in the present embodiment, the cushioning material 18 is provided on the side of the deformation portion 60 of the resilient support 16 that is closer to the attachment member-side fixing portions 56. That is, the cushioning material 18 is provided on the side of the deformation portion 60 of the resilient support 16 at which the amplitude is small. Specifically, as shown in FIGS. 3B and 5, the cushioning material 18 is provided only in portions corresponding to the second X-direction outer extension portion 70e, the third return portion 70f, and the Y-direction outer extension portion 70g of the respective arms 68A, 68B, 68C, and 68D, as well as the Y-direction connecting portions 72. As a result, the amount of deformation of the cushioning material 18 can be suppressed compared to a configuration in which the cushioning material 18 is provided closer to the movable element-side fixing portion 58 than these portions. As a result, degradation of the cushioning material 18 due to repeated deformation can be suppressed. In addition, as a result of being able to suppress degradation due to repeated deformation of the cushioning material 18, changes in the resonance frequency of the vibration system including the resilient support 16 can be suppressed.

Further, in the present embodiment, as shown in FIGS. 3A and 3B, the cover member 20 is applied to the second adhesive surface 18B of the surplus portion 18C of the cushioning material 18, and to the surface (upper surface) at the one side in the Z direction of the second X-direction outer extension portion 70e, the third return portion 70f, and the Y-direction outer extension of the respective arms 68A, 68B, 68C, 68D as well as the Y-direction connecting portions 72. In this configuration, the surplus portion 18C of the cushioning material 18 can be covered by the cover member 20. As a result, it is possible to inhibit foreign matter such as dust from adhering to the second adhesive surface 18B of the surplus portion 18C of the cushioning material 18. Further, a damping effect by the cover member 20 can also be obtained. As a result, the damping effect can be enhanced compared to a configuration in which only the cushioning material 18 is provided.

Further, in the present embodiment, the configuration is such that the second X-direction outer extension portion 70e, the third return portion 70f, the Y-direction outer extension portion 70g of the respective arms 68A, 68B, 68C, and 68D, as well as the Y-direction connecting portions 72, are sandwiched between the cushioning material 18 and the cover member 20. As a result, in addition to the damping effect on the vibration of the resilient support 16 by the cushioning material 18, an effect of attenuating vibration of the resilient support 16 by the cover member 20 can be obtained. In addition, since vibration can be attenuated by both the cushioning material 18 and the cover member 20, the durability of the cushioning material 18 can be improved compared to a case in which only the cushioning material 18 is provided.

Furthermore, in the present embodiment, the cushioning material 18 is in a crushed state (compressed state) between the second X-direction outer extension portion 70e, the third return portion 70f, and the Y-direction outer extension portion 70g of the respective arms 68A, 68B, 68C, and 68D, as well as the Y-direction connecting portions 72, and the cushioning material application surfaces 46 of the frame 22. As a result, even when the second X-direction outer extension portion 70e, the third return portion 70f, and the Y-direction outer extension portion 70g of the respective arms 68A, 68B, 68C, and 68D, as well as the Y-direction connecting portions 72, deform toward the opposite side from the attachment member 12 (toward the one side in the Z direction), the state of contact between the cushioning material 18 and the resilient support 16 and the state of contact between the cushioning material 18 and the attachment member 12 can be maintained.

Further, in the present embodiment, each arm 68A, 68B, 68C, 68D of the deformation portion 60 of the resilient support 16 is provided with the first X-direction outer extension portion 70a, the first return portion 70b, the X-direction inner extension portion 70c, the second return portion 70d, the second X-direction outer extension portion 70e, the third return portion 70f and the Y-direction outer extension portion 70g. As a result, compared to a configuration without the third return portion 70f or the Y-direction outer extension portion 70g, the lengths of the arms 68A, 68B, 68C, and 68D of the deformation portion 60 can be increased. As a result, the load on the respective arms 68A, 68B, 68C, and 68D can be reduced, the load applied to the movable element-side fixing portion 58 and the attachment member-side fixing portions 56 can also be reduced, and the occurrence of metal fatigue can be made less likely. Accordingly, the durability of the respective arms 68A, 68B, 68C, and 68D can be improved. Further, compared to a configuration without the third return portion 70f or the Y-direction outer extension portion 70g, the resonance frequency of the vibration system including the resilient support 16 can be lowered.

Further, the cushioning material is provided along the second X-direction outer extension portion 70e, the third return portion 70f, and the Y-direction outer extension portion 70g. In this way, by providing the third return portion 70f and the Y-direction outer extension portion 70g, the cushioning material 18 can be easily disposed between the attachment member 12 and the arms 68A, 68B, 68C, and 68D at positions at which the amount of deformation is small.

Furthermore, in the present embodiment, the first arm 68A and the third arm 68C having the third return portion 70f and the Y-direction outer extension portion 70g are disposed on one side in the X direction with respect to the movable element-side fixing portion 58 and are formed symmetrically in the Y direction. Further, the second arm 68B and the fourth arm 68D having the third return portion 70f and the Y-direction outer extension portion 70g are disposed on the other side in the X direction with respect to the movable element-side fixing portion 58 and are formed symmetrically in the Y direction. Furthermore, the first arm 68A and the second arm 68B are formed symmetrically in the X direction. Further, the third arm 68C and the fourth arm 68D are formed symmetrically in the X direction. As a result, the ratio of the lengths of the four arms 68A, 68B, 68C, and 68D to the exclusive area of the resilient support 16 as viewed in the Z direction can be increased.

Furthermore, in the present embodiment, the configuration is such that two cushioning materials 18 are provided for four arms 68A, 68B, 68C, and 68D. Specifically, one of the cushioning materials 18 is provided at a position at which two arms (the first arm 68A and third arm 68C) are adhered to the same surface, and the other cushioning material 18 is provided at a position at which two arms (the second arm 68B and fourth arm 68D) are adhered to the same surface. As a result, compared to a configuration in which four cushioning materials 18 are respectively provided for the four arms 68A, 68B, 68C, and 68D, the number of pieces of the cushioning material 18 can be reduced.

Further, in the present embodiment, the resilient support 16 is provided with a Y-direction connecting portion 72 that connects the third return portion 70$f$ of the first arm 68A with the third return portion 70$f$ of the third arm 68C in the Y direction, and is provided with a Y-direction connecting portion 72 that connects the third return portion 70$f$ of the second arm 68B and the third return portion 70$f$ of the fourth arm 68D in the Y direction. As a result, compared to a configuration without the Y direction connecting portions 72, the flatness of the deformation portion 60 of the resilient support 16, which is formed in a plate shape, in a free state can be increased. In particular, the flatness of the deformation portion 60 when the resilient support 16 is press-molded can be improved. In addition, since the flatness of the deformation portion 60 is maintained, individual differences in parts are less likely to occur, and variations in spring coefficients (variations in hardness and stiffness) can be suppressed.

Furthermore, in the present embodiment, in a state in which the four attachment member-side fixing portions 56 of the resilient support 16 are respectively fixed to the four pedestal portions 40 of the frame 22, the four attachment member-side fixing portions 56 cannot be separated from the four pedestal portions 40 of the frame 22, respectively. As a result, at the fixed portion between the attachment member-side fixing portion 56 and the pedestal portion 40, it is possible to suppress changes in the contact state between the two. As a result, it is possible to suppress a shift in the resonance point of the resilient support 16 resulting from a change in the contact state between the two.

Figure 6:
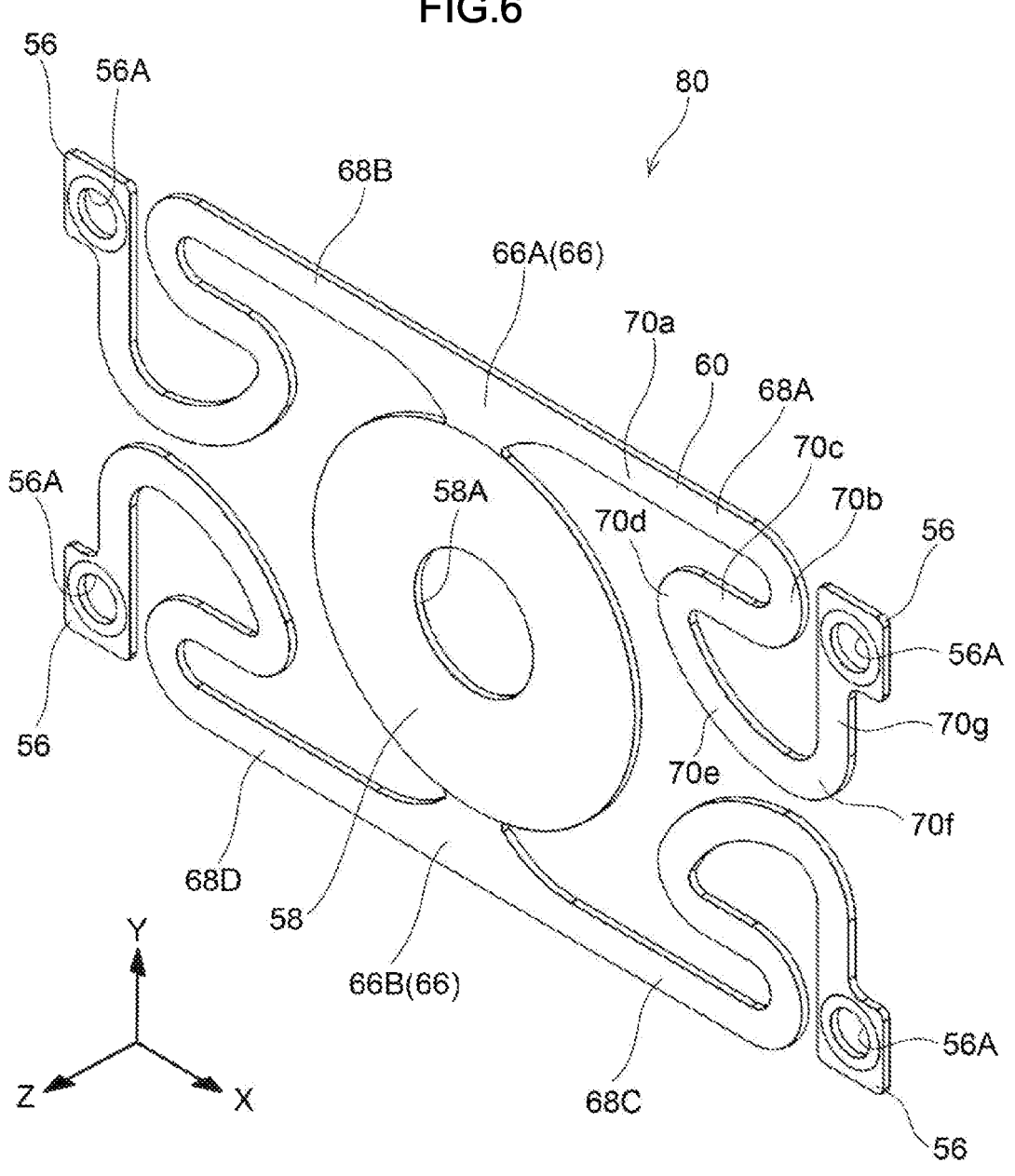
FIG. 6 is a perspective view showing another aspect of the resilient support.
Figure 7:
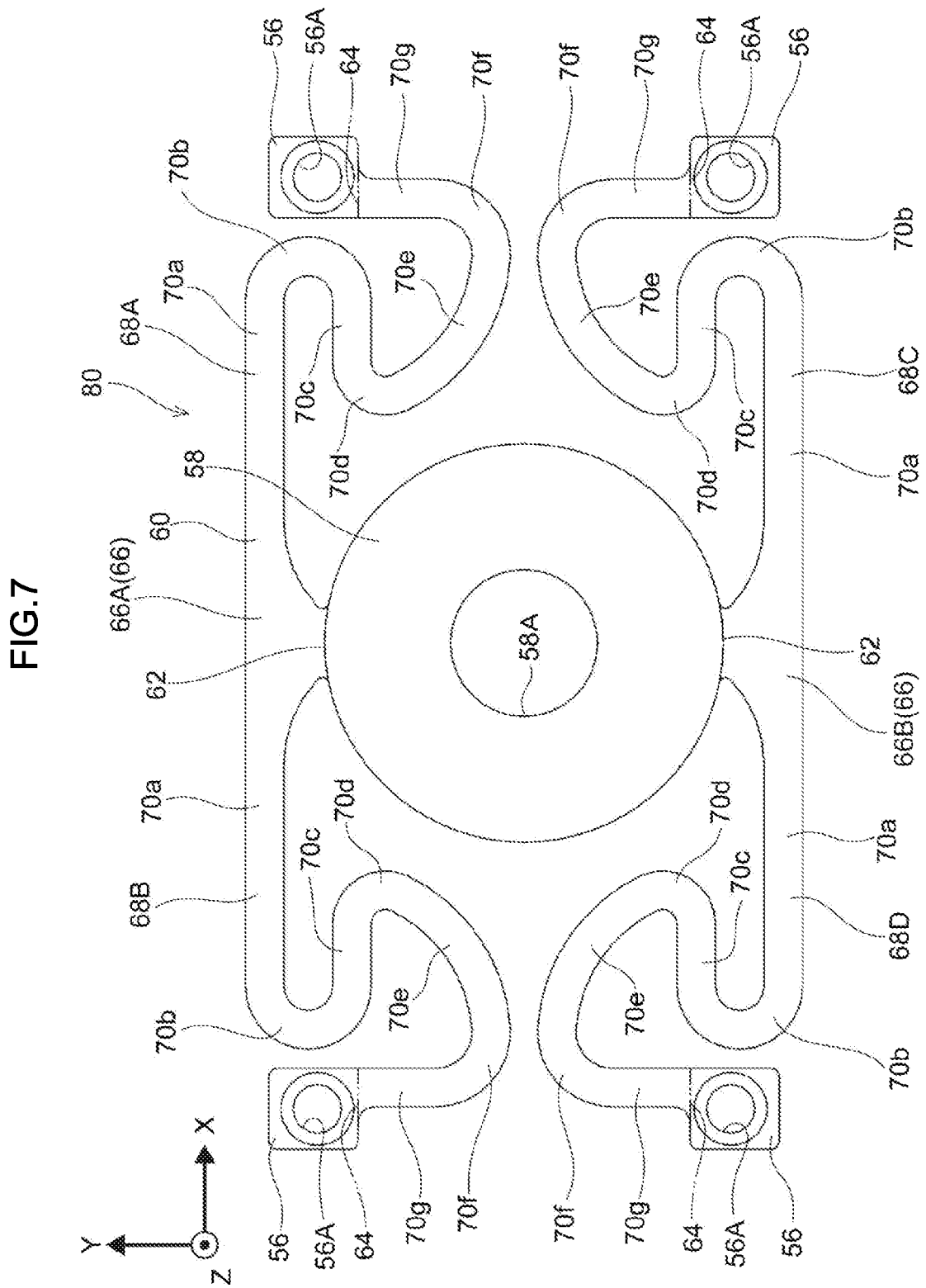
FIG. 7 is a plan view showing another aspect of the resilient support.

In addition, in the example explained above, the resilient support 16 is provided with a Y-direction connecting portion 72 that connects the third return portion 70$f$ of the first arm 68A with the third return portion 70$f$ of the third arm 68C in the Y direction, and is provided with a Y-direction connecting portion 72 that connects the third return portion 70$f$ of the second arm 68B and the third return portion 70$f$ of the fourth arm 68D in the Y direction; however, the present disclosure is not limited thereto. For example, as in the resilient support 80 shown in FIGS. 6 and 7, a configuration may be adopted in which the Y-direction connecting portions 72 are not provided. Here, in the resilient support 80 shown in FIGS. 6 and 7, portions corresponding to the resilient support 16 described above are assigned the same reference numerals as those corresponding to the resilient support 16 described above.

Figure 8:
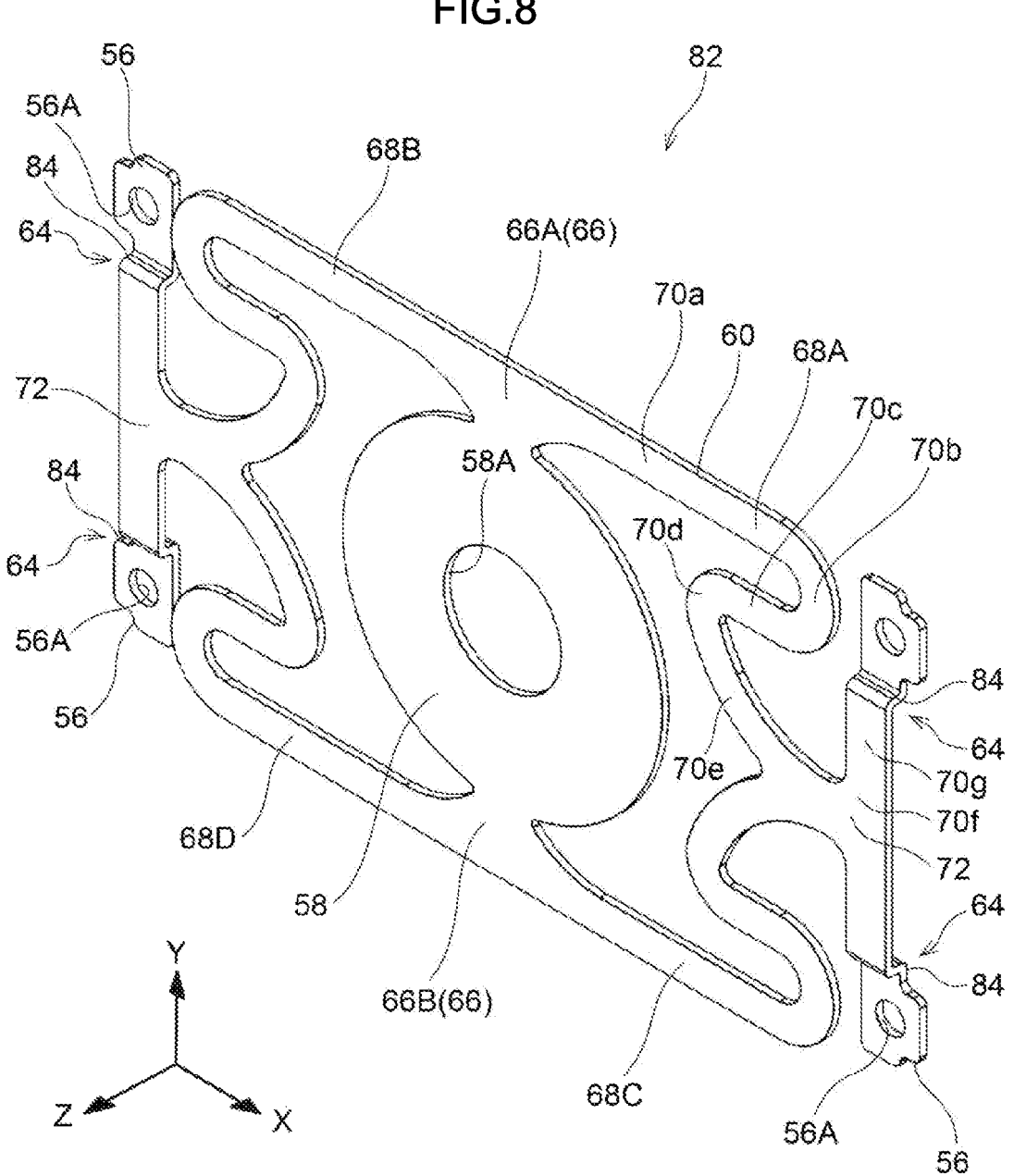
FIG. 8 is a plan view showing another aspect of the resilient support.

Further, in the example explained above, both surfaces of the resilient support 16 are entirely planar; however, the present disclosure is not limited thereto. For example, as in the resilient support 82 shown in FIG. 8, a configuration may be adopted in which step portions 84 are formed at the four locations corresponding to the terminal ends 64 of the deformation portion 60. Further, although not shown in the drawings, a configuration may be adopted in which step portions are formed at the two locations corresponding to the starting ends of the deformation portion of the resilient support. In the configuration shown in FIG. 8, the movable element-side fixing portion 58 and the deformation portion 60 are offset to the one side in the Z direction with respect to the four attachment member-side fixing portions 56. In this way, in FIG. 8, the step portions 84 are formed, and the movable element-side fixing portion 58 and the deformation portion 60 are offset to the one side in the Z direction with respect to the attachment member-side fixing portions 56; however, the configuration may be offset to the other side in the Z direction. By providing the step portions 84, the step portions can be used as the base point of the deformation portion 60, and stress applied to the attachment member-side fixing portions 56 can be reduced. Further, as shown in FIG. 8, by making the movable element-side fixing portion 58 and the deformation portion 60 offset to the one side in the Z direction with respect to the attachment member-side fixing portions 56, while suppressing an increase in the overall height of the actuator, it is possible to increase the degree of freedom in the thickness dimension of the cushioning material, and to widen the adjustment range of the damping effect of the cushioning material. Here, in the resilient support 82 shown in FIG. 8, portions corresponding to the resilient support 16 described above are assigned the same reference numerals as those corresponding to the resilient support 16 described above.

Further, in the example described above, the four attachment member-side fixing portions 56 are each fixed to the four pedestal portions 40 of the frame 22 by welding; however, the present disclosure is not limited thereto. For example, the four attachment member-side fixing portions 56 may be removably fixed to the four pedestal portions 40 of the frame 22 using screws or the like.

Furthermore, in the example explained above, a configuration in which two cushioning materials 18 are provided for the four arms 68A, 68B, 68C, and 68D has been described; however, the present disclosure is not limited thereto. The number of arms 68A, 68B, 68C, 68D and the number of cushioning materials 18 may be set appropriately in consideration of the vibration characteristics and the like required of the actuator 10.

Further, in the example explained above, the cushioning material 18 is provided only in portions corresponding to the second X-direction outer extension portion 70$e$, the third return portion 70$f$, and the Y-direction outer extension portion 70$g$ of the respective arms 68A, 68B, 68C, and 68D, as well as to the Y-direction connecting portions 72; however, the present disclosure is not limited thereto. For example, the cushioning material 18 may be provided closer to the movable element-side fixing portion 58 than the foregoing position. In this way, the position at which the cushioning material 18 is provided may be appropriately set in consideration of the durability and the like required of the cushioning material 18. For example, by adjusting the dimensions of the cushioning material 18 in the X direction or the like, the resonance frequency of the vibration system including the resilient support 16 may be adjusted. For example, as shown by the two-dot chain line in FIG. 3B, the dimension in the Y direction from the end of the cushioning material 18 at an opposite side from the movable element-side fixing portion 58 may configured at a dimension ½ W that is half of the dimension of the example explained above, or at a dimension ⅔ W that is two-thirds thereof. In this case, as the dimension in the Y direction from the end of the cushioning material 18 at an opposite side from the movable element-side fixing portion 58 is shortened, the resonance frequency of the vibration system including the resilient support 16 can be lowered.

Furthermore, in the example described above, the cover member 20 is provided; however, the present disclosure is not limited thereto. Regarding whether or not to provide the cover member 20, this may be configured as appropriate, taking into account the type and size of foreign objects that are expected to adhere to the second adhesive surface 18B of the cushioning material 18, the vibration damping effect of the resilient support 16 required of the cover member 20, and the like.

Further, in the example explained above, one entire surface of the cover member 20 has an adhesive surface; however, the present disclosure is not limited thereto. For example, even if the cover member does not have an adhesive surface, it can be applied to the adhesive surface of the cushioning material. In such a case, the damping effect can be enhanced by disposing the deformation portion between the cushioning material and the cover member. Further, it is possible to partially provide an adhesive surface on one side of the cover member. For example, an adhesive surface may be provided only at the contact portion with the deformation portion, being appropriately configured in consideration of the vibration damping effect of the resilient support.

Furthermore, the configurations described above can also be applied to an actuator including a resilient support in which each of the arms 68A, 68B, 68C, and 68D has a different configuration.

Although one embodiment of the present disclosure has been explained above, the present disclosure is not limited to the foregoing, and, in addition to the foregoing, may, of course, be implemented by being modified in various ways within a scope that does not depart from the gist thereof.

The disclosure of Japanese Patent Application No. 2021-141919 filed on Aug. 31, 2021, is incorporated herein by reference in its entirety.

The invention claimed is:

1. An actuator, comprising:
an attachment member including a coil;
a movable element having a magnet disposed facing the coil, the movable element being displaced relative to the coil by energization of the coil;
a resilient support having an attachment member-side fixing portion that is fixed to the attachment member, a movable element-side fixing portion that is fixed to the movable element, and a deformation portion that links the attachment member-side fixing portion and the movable element-side fixing portion; and
a cushioning material provided between the attachment member and the deformation portion, the cushioning material deforming in conjunction with bending deformation of the deformation portion,
wherein the cushioning material is a discrete member from the resilient support.

2. The actuator of claim 1, wherein:
the resilient support and the cushioning material are disposed overlapping with each other in a thickness direction, and the cushioning material has an adhesive surface at a side of the deformation portion, the adhesive surface being adhered to the deformation portion.

3. The actuator of claim 2, wherein the cushioning material has an adhesive surface at a side of the attachment member, the adhesive surface being adhered to the attachment member.

4. The actuator of claim 2, wherein:
the cushioning material has a surplus portion that does not overlap with the deformation portion as viewed from the thickness direction, the actuator further comprises a cover member,
the deformation portion is disposed between the cover member and the cushioning material, and
the cover member is applied to the surplus portion.

5. The actuator of claim 4, wherein the cover member has an adhesive surface, the adhesive surface being adhered to the deformation portion and to the cushioning material.

6. The actuator of claim 1, wherein the cushioning material is provided in a compressed state between the attachment member and the deformation portion.

7. The actuator of claim 1, wherein the cushioning material is provided at a side of the attachment member-side fixing portion of the deformation portion.

8. The actuator of claim 7, wherein:
when a displacement direction in which the movable element displaces is designated a ±Z direction and mutually perpendicular directions among directions in a plane orthogonally intersecting the ±Z direction are designated an X direction and a Y direction, the deformation portion includes an arm extending from the movable element-side fixing portion to the attachment member-side fixing portion,
the arm including:
a first X-direction outer extension portion extending from a side of the movable element-side fixing portion toward an outer side in the X direction,
a first return portion formed closer to the attachment member-side fixing portion than the first X-direction outer extension portion, at which an extension direction is turned back from the outer side in the X direction to an inner side in the X direction,
an X-direction inner extension portion extending from the first return portion toward the inner side in the X direction,
a second return portion formed closer to the movable element-side fixing portion than the X-direction inner extension portion, at which the extension is turned back from the inner side in the X direction to the outer side in the X direction,
a second X-direction outer extension portion extending from the second return portion toward the outer side in the X direction,
a third return portion formed closer to the attachment member-side fixing portion than the second X-direction outer extension portion, at which the extension is turned from the outer side in the X direction to an outer side in the Y direction, and
a Y-direction outer extension portion extending from the third return portion toward the outer side in the Y direction and connected to the attachment member-side fixing portion, and
the cushioning material is provided along the second X-direction outer extension portion, the third return portion, and the Y-direction outer extension portion.

9. The actuator of claim 8, comprising two cushioning materials, wherein:
the resilient support includes four attachment member-side fixing portions and four arms,
two of the four arms are disposed at one side in the X direction relative to the movable element-side fixing portion and are formed symmetrically in the Y direction,
another two of the four arms are disposed at another side in the X direction relative to the movable element-side fixing portion and are formed symmetrically in the Y direction, one of the cushioning materials is provided at a position at which the two arms disposed at the one side in the X direction relative to the movable element-side fixing portion adhere at a same surface thereof, and another of the cushioning materials is provided at a position at which the other two arms disposed at the other side in the X direction relative to the movable element-side fixing portion adhere at a same surface thereof.

10. The actuator of claim 9, wherein:

the deformation portion is formed in a plate shape, a Y-direction connecting portion that connects, in the Y direction, the third return portions of the two arms disposed at the one side in the X direction relative to the movable element-side fixing portion, and a Y-direction connecting portion that connects, in the Y direction, the third return portions of the other two arms disposed at the other side in the X direction relative to the movable element-side fixing portion, are provided, the one cushioning material is provided along one of the Y-direction connecting portions, and the other cushioning material is provided along another of the Y-direction connecting portions.

11. The actuator of claim 1, wherein a step portion is formed at an end portion at an attachment member-side fixing portion side of the deformation portion of the resilient support, and the movable element-side fixing portion and the deformation portion are separated from the attachment member, in a thickness direction of the resilient support, than the attachment member-side fixing portion.

* * * * *